Feb. 7, 1961

E. L. ZEIGLER ET AL 2,970,480

ANTI-FRICTION SUPPORT MECHANISM FOR
GYROSCOPIC DEVICES

Filed Sept. 24, 1956

INVENTORS
EDGAR L. ZEIGLER
MARTIN S. KLEMES
BY
ATTORNEY

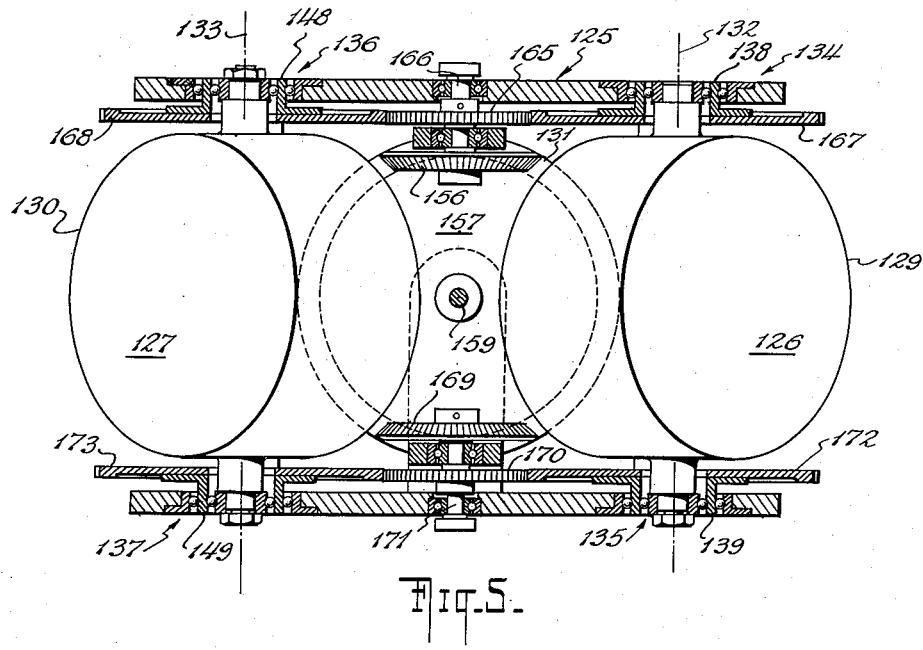
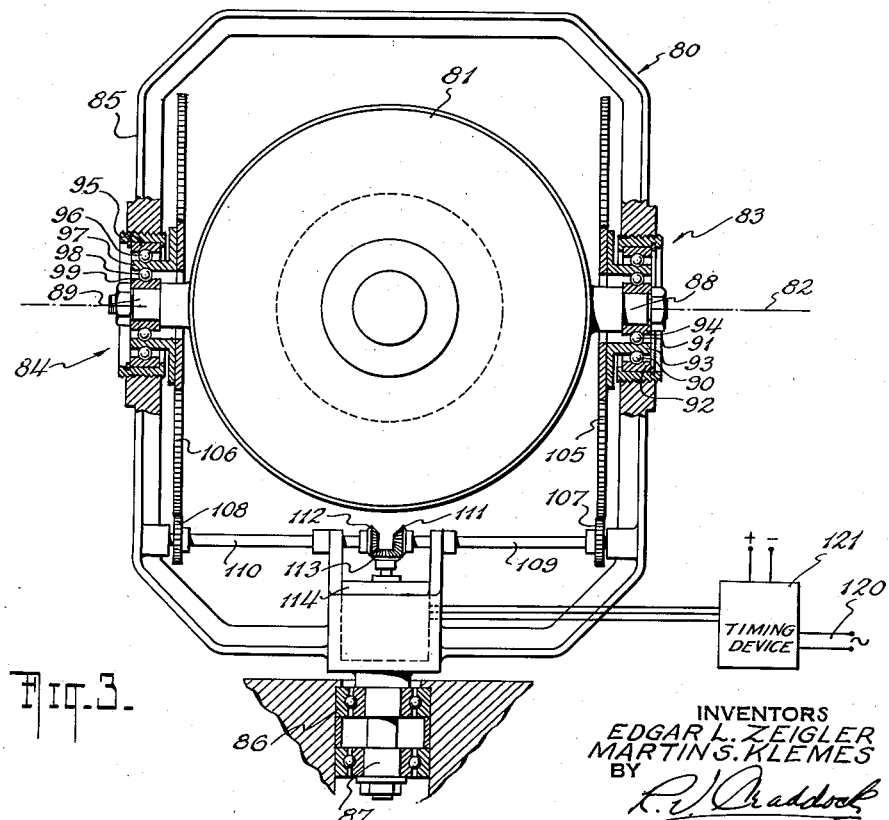

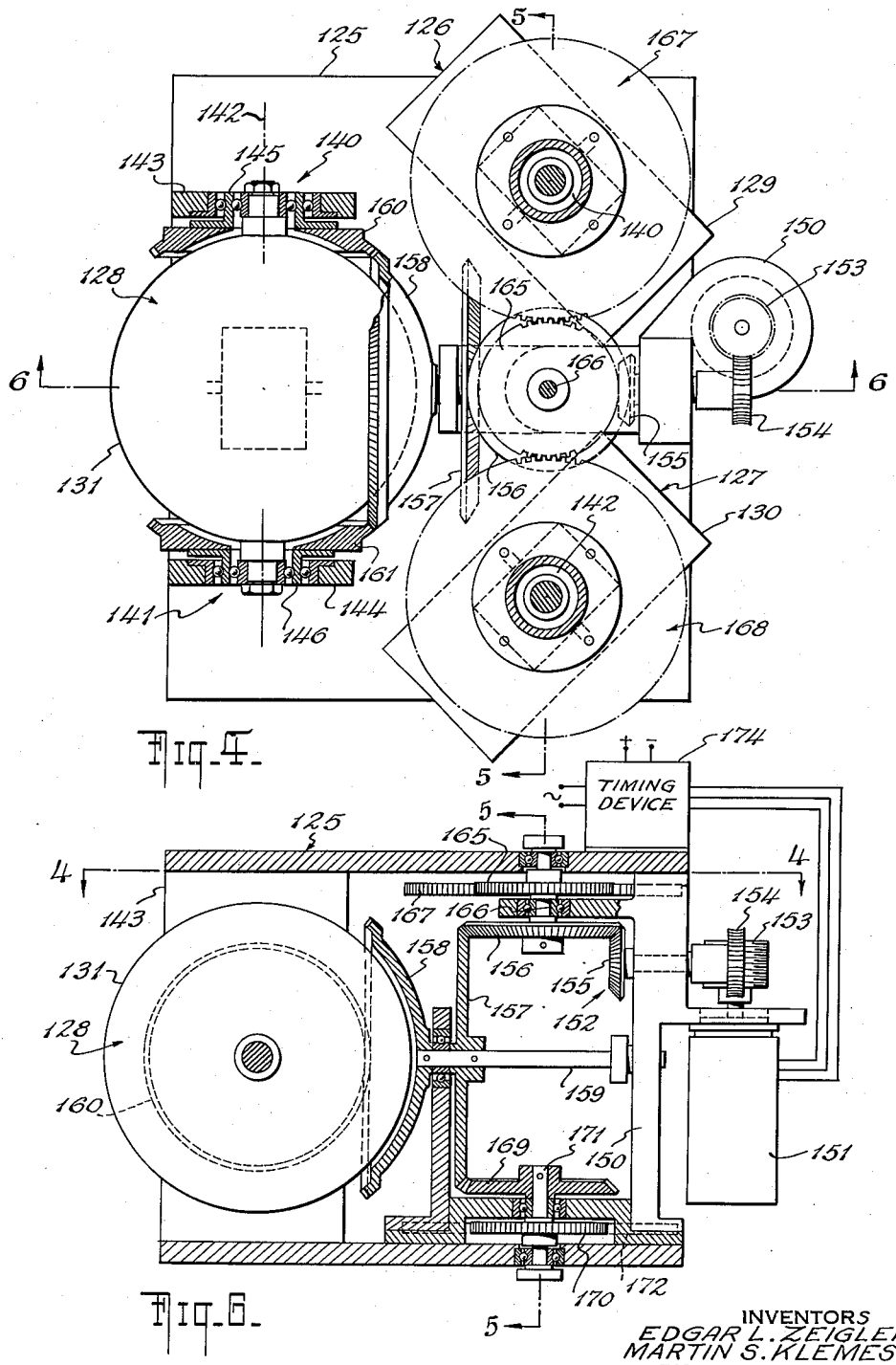

United States Patent Office 2,970,480
Patented Feb. 7, 1961

2,970,480

ANTI-FRICTION SUPPORT MECHANISM FOR GYROSCOPIC DEVICES

Edgar L. Zeigler, Glen Cove, and Martin S. Klemes, New York, N.Y., assignors to Sperry Rand Corporation, Great Neck, N.Y., a corporation of Delaware Filed Sept. 24, 1956, Ser. No. 611,737

28 Claims. (Cl. 74—5)

The present invention relates to an anti-friction support mechanism for the moving elements of gyroscopic devices and the like, and particularly relates to anti-friction mechanisms and methods for improving the accuracy of gyroscopic instruments.

The accuracy of a gyro instrument is usually defined as a certain level of drift rate or random wander of the gyro spin axis in inertial space. Such drift rates are governed by the law $$W = \frac{L}{H}$$

where W is the drift rate, H the angular momentum of the gyroscopic element and L is the disturbing torque; each being present on mutually perpendicular axes. Torques can be present from a variety of causes. Usually, the most difficult torques to control are torques about the gyro suspension axis, particularly those caused by the supporting bearing.

In extremely high accuracy devices, particularly gyroscopic apparatus, there is an increasing demand for higher accuracy instruments necessitating improvements in journalling mechanisms particularly those of the rolling bearing type. In prior gyroscopic apparatus, the problem of drift of the gyroscope has been particularly troublesome and extensive efforts have previously been made to minimize that portion of the aforesaid drift caused by friction.

One method of reducing drift, shown in Patent No. 1,845,592, involves rotating the bearings by rotating each of the bearing races of two diametrically opposed bearings continuously and in opposite directions to each other. A further method of reducing drift, shown in Patent No. 841,612, relates to the rotation of one bearing race of only a single bearing through an arc of 180° or less alternately in opposite directions.

Another method of reducing drift, shown in Patent No. 2,410,602, is to utilize a bearing mechanism which has an outer race, a middle race and an inner race. By having the middle race pendulous it is oscillated over a small arc by gravity and acceleration effects.

The present invention applies to gyroscopic apparatus having anti-friction, supporting, journalling devices in single or multiple configurations. In the invention, these journalling devices are rotated materially more than one-half revolution and periodically reversed in rotation. In a preferred embodiment of the invention, the journalling mechanism comprises at least two series of rolling bearings with a middle race intermediate thereof and the middle race is rotated over an arc considerably greater than 180° and may be periodically reversed. Where a pair of bearings are used, as on diametrically opposed trunnions, it is preferable that each bearing be rotated in a direction opposite to the other for several revolutions and that rotation of each bearing be periodically and simultaneously reversed whereby the drift rate of a gyroscopic apparatus, for example, is appreciably improved.

An object of the present invention therefore is to provide an anti-friction support mechanism for gyroscopic instruments.

A further object of the invention is to provide an anti-friction support mechanism for gyroscopic instruments which appreciably improves the accuracy of said instruments.

Another object of the invention is to provide an anti-friction method of journalling for gyroscopic instruments which appreciably improves the accuracy of said instruments.

Other objects, features and structural details of the invention will become apparent from the following description in the drawings wherein like reference characters indicate like elements, wherein:

Fig. 3 is a longitudinal section of a directional gyro embodying the present inventive concepts with parts of the drawings in elevation;

Fig. 4 is a plan view taken along line 4—4 of Fig. 6 of a three gyro platform embodying the present inventive concepts with parts of the drawing in section;

Fig. 5 is a section taken along line 5—5 of Fig. 4 with parts of the drawings in elevation; and Fig. 6 is a section along line 6—6 of Fig. 4 with parts of the drawings in elevation.

Figure 1:
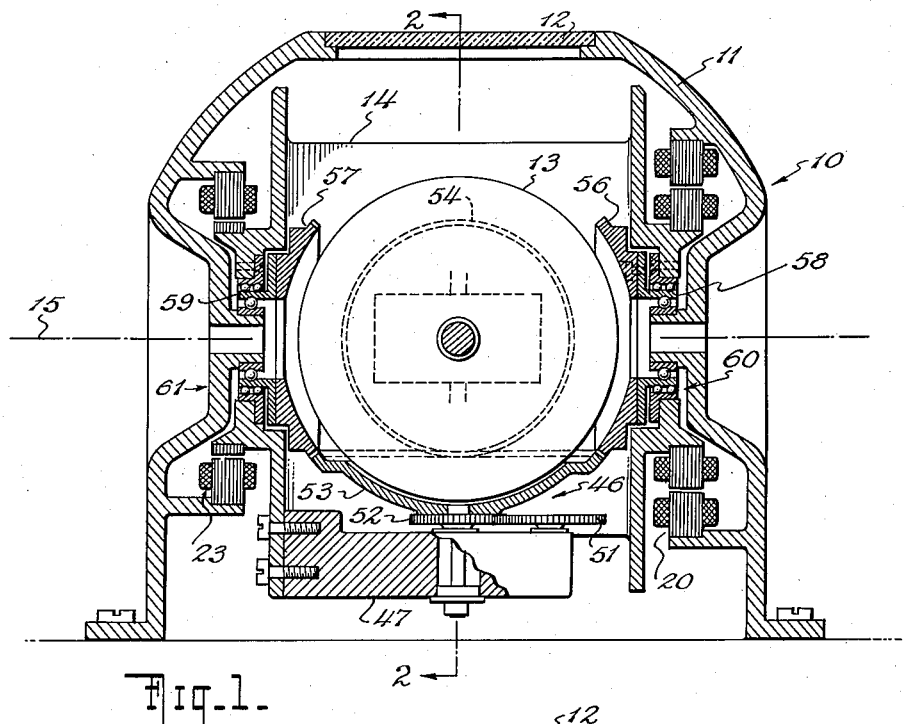
Fig. 1 is a longitudinal section of a vertical gyro embodying the inventive concepts of the present invention with parts of the drawings in elevation.

When the average torque of a ball bearing is measured as a function of the relative speed of the races, it is found that the static breakaway torque is relatively high. As speed is slowly raised the average torque falls rapidly but not discontinuously to a lower and fairly constant value for a large intermediate range of speed. At higher speeds, viscous and other effects again raise the torque to large values and ultimately to bearing failure. The torques just described are average torques and exhibit considerable randomness in instantaneous value, particularly at lower speeds. To reduce the net effect of the average running torque in accordance with this invention it is desirable to operate the bearing in the low and constant region of the curve and to rotate it exactly half the time in each direction. An optimum oscillatory motion from this viewpoint would operate at an appropriate constant speed of rotation, accurately timed in each direction with quick reversal to minimize low-speed dwell time. The speed of rotation should be greater than other independent motions of the bearing which otherwise could cause unequal time of operation in opposite directions.

Various repetitive geometric irregularities in even the best available bearings cause small torques independent of friction. The geometric irregularities cause the supported member to be raised or lowered slightly or cause variations of strain in deflected parts as the bearing rotates and in seking its position of lowest potential energy, small but significant torques are present on the axis. At low torque levels a significant portion of bearing torques results from conservative forces in addition to dissipative friction forces. The mechanism of energy storage in these conservative force sysems is either potential energy of the supported mass or strain energy in deformed parts of the bearing. An example of such a conservative force system is the torques arising from the raising and lowering of the bearing race at it rolls over successive balls in the bearings. A radially loaded ball bearing for instance, is subject to a torque periodic with the loading of its finite number of balls which may be called "ball action." Other systematic errors such as ellipticity of the races or misalignments of the bearing parts contribute similar torques. Insofar as these torques are a definite function of the relative position of the bearing parts, they can be effectively averaged by rotating the bearing at uniform speed and thus spending equal average time in all bearing orientations. In order to scan all bearing orientations accurately a motion of the order of several revolutions of the races is desirable. When net torque is plotted as a function of an oscillatory rotation amplitude, the torque reduces sharply as the amplitude is increased from a few degrees to one or more revolutions, and reduces more slowly as the number of revolutions per cycle increases. Such a curve will usually show local minima associated with ball geometry or other features of the bearing design.

Torques may also be present due to random geometric effects. These include actual dirt particles or minor fixed race irregularities not repeated at every rotation of the bearing. In the absence of bearing rotation the bearing may operate in the presence of a particular disturbance for long periods of time. By imposing a large motion on the bearing such effects are reduced from a quasi-static effect to a small statistical random walk effect. Small oscillations may reduce dirt effects but not the effect of such things as one oversized ball. Here it is necessary that the oversize ball have no preferred position in the bearing, which requires an amplitude of oscillation of one or more revolutions. The anti-friction support mechanism to be described incorporates an optimum oscillatory motion that minimizes all of the aforesaid effects.

The present invention overcomes not only the effects caused by friction but also minimizes the errors caused by geometrical asymmetry and the aforesaid bearing "ball action." Thus, the present invention overcomes not only the effects caused by dissipative friction forces but also minimizes the torques from conservative force systems existing in the bearing.

While the present invention is described as applied to certain configurations of rolling bearing means, it is to be understood further that the present invention is applicable not only to all types of rolling bearing means but is also adaptable to mechanisms that do not contain rolling bearing means. The invention is applicable to any gyroscopic journalling mechanism with the requisite angular freedom to accommodate the motion imposed such as journals with sliding contact, or journals deriving support from pneumatic, hydraulic, electromagnetic or electrostatic forces.

Figure 2:
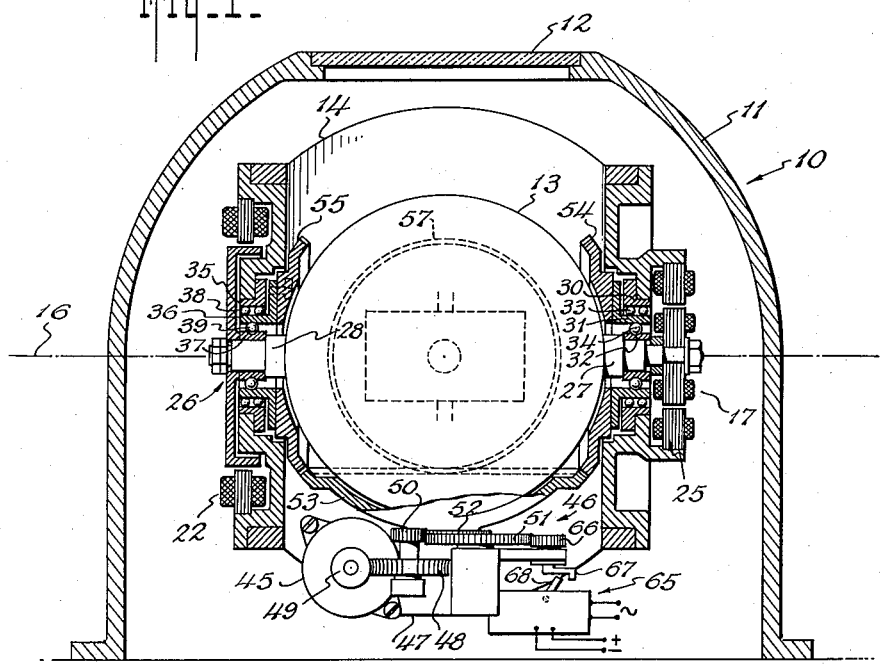
Fig. 2 is a section taken along line 2—2 of Fig. 1 with parts of the drawings in elevation.

With reference now to Figs. 1 and 2 of the drawings, the present invention will be described in a typical environment. A vertical gyroscope as indicated at 10, is shown to include a housing or frame 11 that may be suitably fixed to an aircraft (not shown) having a longitudinal or fore and aft axis. The housing 11 includes a window 12 suitable for viewing the interior of the gyro vertical 10. The gyro vertical 10, per se, includes an inner gimbal or rotor case 13 whose rotor (shown in dotted lines) is spun about a substantially vertical axis by suitable means known in the art. As shown, the rotor case 13 is universally supported on housing 11 by an outer gimbal 14. The major horizontal axis or support of the rotor case 13 of the gyro vertical 10 as indicated at 15 preferably parallel to or coincident with the fore and aft or longitudinal axis of the aircraft on which the instrument is employed. The minor horizontal axis of support of the rotor case 13 of the gyro vertical 10 indicated at 16 is preferably parallel to or coincident with the pitch or athwartship axis of the aircraft.

A pick-off 17 of the selsyn type is indicated coaxial with the pitch axis 16 of the gyro vertical. The instrument also includes a pick-off 20 of the selsyn type coaxial with the roll axis 15. The gyro vertical further includes erecting means in the form of torque motors 22 and 23. The output of the pick-offs 17 and 20 may be fed respectively to control the operation of an automatic pilot or a pitch and roll indicating repeater of conventional construction.

Composite bearings are shown applied about the pitch axis 16 at 25 and 26. In the preferred embodiment shown, the trunnions 27 and 28 of the rotor case 13 are journalled about the pitch axis 16 to the gimbal 14 by diametrically opposed composite rotatable bearings 25 and 26 respectively. The composite bearing 25 comprises an outer member or race 30, a rotatable middle member or race 31 which may be in the form of a ring, and an inner member or race 32. A double row of balls 33 rotatably engages the outer race 30 and middle race 31. A single row of balls 34 rotatably engages the middle race 31 and the inner race 32. Similarly, composite bearing 26 comprises an outer race 35, a middle race 36 and an inner race 37. A double row of balls 38 rotatably engages the outer race 35 and middle race 36 and a single row of balls 39 rotatably engages the middle race 36 and inner race 37.

Preferably, the middle races 31 and 36 are rotatable through several revolutions in each direction. In a preferred embodiment of the invention, each middle race is rotated in a direction opposite to its diametrically opposed middle race and the direction of rotation of each middle race of said bearing is periodically and simultaneously reversed. A suitable mechanism for accomplishing this result is indicated as a constant speed electric motor 45 the middle races 31 and 36 through a power transmission means such as gear train 46. The motor 45 is mounted on bracket 47 that in turn is supported on gimbal 14. The motor 45 drives gear 48 through worm 49. Pinion 50 is shafted to gear 48 and drives spur gear 51. Spur gear 51 drivably meshes with spur gear 52. The driven spur gear 52 is fixedly coupled to bevel gear 53 which in turn drives bevel gears 54 and 55 that are fixedly coupled to the middle races 31 and 36 of bearings 25 and 26 respectively about the pitch axis.

In a similar manner, bevel gear 53 also drives through bevel gears 56 and 57 which are fixedly coupled to middle races 58 and 59 of composite bearings 60 and 61 respectively that are mounted on the roll axis. By this arrangement, the middle race 31 of bearing 25 is driven, for example, in a clockwise direction around the pitch axis while the middle race 36 of bearing 26 is driven in a counterclockwise direction around the same axis. In a similar manner the middle race 58 of bearing 60 is driven in a clockwise direction, for example, while the middle race 59 of bearing 61 is driven in a counterclockwise direction around the roll axis. Preferably, the gear train from the motor to the middle races is a reduction gearing such that the motor may rotate at several thousand r.p.m. while the middle races rotate at a slower speed, for example, twenty r.p.m.

To achieve optimum accuracy as explained previously, the direction of rotation of the bearings is periodically and preferably simultaneously reversed. In a preferred embodiment, the bearing is rotated at least a single revolution and usually, it is rotated through several revolutions and then reversed.

The mechanism for reversing the direction of rotation of the bearings may include switching means such as a mechanical switching device 65 as indicated in Fig. 2. The gear 51 drives gear 66 which is fixedly coupled to arm 67. The arm 67 contacts switch 68 at a time interval depending upon the gear reduction to reverse the polarity of the potential on the motor thereby reversing the direction of rotation of the motor 45 and consequently reversing the direction of rotation of all the middle races through the gear train 46. The direction of the bearings are therefore periodically and simultaneously reversed. In a preferred embodiment of the invention, the direction of rotation of the middle races is reversed at approximately thirty second intervals thus each middle race would be rotated for ten revolutions in one direction and then would have its direction of rotation reversed to rotate ten revolutions in the opposite direction. The configuration shown in Figs. 1 and 2 is also adaptable to a two gyro platform arrangement.

The present invention may also be practiced in other ways such as by rotating the outer race of a bearing similar to that indicated in Figs. 1 and 2 and periodically reversing the direction of rotation of the outer race by suitable means such as that indicated previously. The advantageous effects of the present invention may also be accomplished in certain cases by rotating the inner race in a similar manner. The present invention may be utilized to considerable advantage in all gyroscopic bearing applications where it is desirable to minimize static friction, kinematic torque, bearing or apparatus asymmetrical geometry, dirt or other foreign substance in the bearing, that could produce error or drift, such as vertical gyros, directional gyros, gyroscopic platforms, gyroscopic integrating and other gyroscopic precision instrument application. By utilizing the present invention appreciably greater accuracy is attainable at less cost than with any other known device.

Especially with directional gyros, the present invention affords unusual accuracy and minimization of drift. Referring to Fig. 3 a directional gyro is indicated at 80 and is shown to include a rotor (indicated by a dotted line) having its spin axis horizontally mounted in an inner gimbal or rotor casing 81. The rotor is spun about a substantially horizontal axis by suitable means known in the art. The rotor case is mounted on a horizontal axis 82 by composite bearings 83 and 84 in outer gimbal 85. Gimbal or vertical ring 85 is pivoted in a supported casing (not shown) in the usual manner on a vertical axis coaxial with pivot or bearing 86 and pivot shaft 87, the latter being fixedly coupled to gimbal 85.

The bearings 83 and 84 rotatably supporting the trunnions 88 and 89 of the rotor case 81 along the horizontal axis 82 are similar to the bearings 25 and 26 previously described. Bearing 83 has more than one anti-friction means in the form of two circular series of bearing balls 90 and 91. The balls 90 are rotatably cooperative with outer race 92 and middle race 93 while balls 91 are similarly interposed between middle race 93 and inner race 94. Bearing 84 is of similar construction having an outer race 95, balls 96, middle race 97, balls 98 and inner race 99. The middle races 93 and 97 are fixedly coupled to spur gears 105 and 106 respectively and rotatable therewith.

The spur gears 105 and 106 are driven by pinions 107 and 108 respectively. Connected to the pinions 107 and 108 on suitably supported rotatable shafts 109 and 110 are bevel gears 111 and 112 respectively. The bevel gears 111 and 112 are driven in opposite directions by bevel gear 113 and that in turn is driven by motor 114.

The motor 114 is supplied with a suitable source of power 120 through an electrical timing device 121, which may be a multivibrator, for example, that periodically reverses the polarity of the potential to the motor 114 thereby reversing the direction of rotation thereof periodically. The spin axis of the motor armature of motor 114 is preferably aligned and substantially coaxial with the vertical axis of the directional gyro 80 to minimize undesirable torque due to reversing the direction of rotation of the motor armature periodically. The gear train is so constructed that the rotation of the motor 114 drives middle race 93 of bearing 83 in one direction while the middle race 97 of bearing 84 is simultaneously driven in the opposite direction. By reversing the direction of rotation of the motor 114, the direction of rotation of each of the middle races 93 and 97 is also reversed thus providing a means for rotating each bearing in a direction opposite to its corresponding bearing and reversing the direction of rotation of each bearing simultaneously and periodically, thereby minimizing drift of a directional gyro.

The present invention may also be applied to other precision instruments such as a stable reference apparatus comprising a plurality of gyroscopes wherein like reference characters indicate like elements as indicated in Figs. 4, 5 and 6 such as a three gyro platform. It is to be understood that although the invention is applied to only one axis of each gyroscope of said three gyro platform, it may be applied to one or more than one axis of each gyro and it may also be applied to the Cardan suspension of the stable platform itself. For purposes of simplification, the Cardan suspension of the stable platform gyroscopic element has not been shown and only the stable platform 125 on which the three gyroscopes 126, 127 and 128 are mounted, has been shown. The platform 125 may be universally suspended in a conventional manner for freedom about three perpendicular axes. The three gyroscopes 126, 127 and 128 are used for detection of and opposition to forces tending to disturb the orientation of the stable platform 125 in space. For example, the gyroscopes 126 and 127 may be provided for affording stabilization for platform 125 about mutually perpendicular horizontal axes while gyroscope 128 is arranged to stabilize platform 125 about the vertical axis. The rotors (shown dotted) of gyroscopes 126 and 127 are spun by a suitable means not shown about horizontal axes and are supported in their respective cylindrical cases 129 and 130. The rotor (shown dotted) of gyroscope 128 is spun by a suitable means not shown about a horizontal axis and is supported in its spherical case 131. The rotor cases 129 and 130 are each journalled to the platform 125 about their respective vertical axes 132 and 133 by means of a pair of composite bearings comprising bearings 134 and 135 and bearings 136 and 137 respectively. The composite bearings 134, 135, 136 and 137 are similar to those previously described and include rotatable middle races 138, 139, 148 and 149 respectively.

The rotor case 131 is journalled by means of composite bearings 140 and 141 about a horizontal axis 142 to supports 143 and 144 that are fixedly coupled to the platform 125. The composite bearings 140 and 141 are again similar to those previously described and include rotatable middle races 145 and 146 respectively.

Mounted on a bracket 150 fixedly coupled to the platform 125 is a motor 151 which drives through a power transmission means such as a gear train 152 to rotate the middle race of each composite bearing. The motor 151 drives through worm 153 and gear 154 which is connected to bevel gear 155 that in turn drives bevel gear 156. Bevel gear 156 engages and drives bevel gear 157. Bevel gear 157 is connected to gevel gear 158 by shaft 159. Bevel gear 158 drives bevel gears 160 and 161 which are fixedly coupled to rotate the middle races 145 and 146 respectively, in directions opposite to each other.

Bevel gear 156 is coupled to pinion 165 by shaft 166. Pinion 165 drivably meshes with spur gears 167 and 168 which are fixedly coupled to rotate middle races 138 and 148 respectively. Bevel gear 156 also drives through bevel gear 157 to drive diametrically opposed bevel gear 169 in a direction opposite to the direction of rotation of bevel gear 156. Bevel gear 169 is in turn coupled to pinion 170 by shaft 171. Pinion 170 drivably meshes with spur gears 172 and 173 which are fixedly coupled to rotate middle races 139 and 149 respectively. Therefore, as the motor 151 rotates and drives through the gear train 152, the middle races which are diametrically opposed to each other are rotated in opposite directions with respect to each other. By reversing the direction of the motor 151 by means of a suitable timing device 174 which, for example, may reverse the leads to the motor 151 in a manner similar to that previously described, the middle races may be rotated in alternate directions and the direction of rotation thereof may be simultaneously and periodically reversed.

While the subject of the present invention has been applied to various typical applications, it is to be understood that they are not to be considered in a limiting sense. For example, the directional gyroscope may have the invention applied about one or more of its axes and this may also be true of the vertical gyroscope. In the multiple gyro platform configuration a number of possibilities for applying the invention are available and depending upon the desired accuracy of the instrument, one or more of the axes of the gyroscopes and of the platform itself may have the invention applied thereto.

While the invention has been applied as utilized with only a certain type ball bearing, it is to be understood that any anti-friction means could be adapted to be within the scope of the present invention. Particularly, rolling bearing means are applicable and any of the known types may be applied. For example around the horizontal axes the outer bearing might be a single row radial bearing or, if greater concentricity and rigidity is desired, a double row radial ball bearing may be used for the outer bearing. Generally, for the inner bearing, a single row radial ball bearing would be satisfactory. On the vertical axis, the outer bearing may be similar to the above depending upon the concentricity and rigidity requirements whereas the inner bearing may be a single row radial or a single angular contact type bearing with other types of thrust bearings also being adaptable to practice the present invention.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyroscope having a casing and a rotor journalled in said casing, suspension means for permitting freedom of movement of the casing about an axis comprising a frame having a pair of diametrically opposed bearing surfaces, trunnions on said casing coaxial with said bearing surfaces, rings interposed between each of said trunnions and said frame bearing surfaces, anti-friction means interposed between said rings and said bearing surfaces and additional anti-friction means interposed between said rings and said trunnions, and means for rotating said rings in opposite directions with respect to one another and periodically reversing the direction of rotation thereof.

2. The combination with a gyroscopic apparatus, of bearing means for rotatably supporting said apparatus, and means for rotating said bearing means for a substantially equal number of revolutions in first one direction and then the opposite direction.

3. In a gyroscopic apparatus, a first gimbal, a second gimbal, a pair of trunnions carried by said first gimbal, a separate rotatable member journalled to each of said trunnions and upon which said second gimbal is journalled, means for simultaneously rotating both of said members in opposite directions, and means for periodically reversing the direction of rotation of said members.

4. In a gyroscopic apparatus of the character claimed in claim 3 said last-mentioned means including means for simuletaneously reversing the direction of said members periodically.

5. A gyroscopic instrument comprising a frame, a rotor and rotor-bearing case, a gimbal, a first pair of bearing means for supporting said gimbal in said frame for pivotal movement about a first axis, a second pair of bearing means for supporting said case in said gimbal for pivotal movement about a second axis substantially perpendicular to said first axis, each of said pairs of bearing means including at least an inner race, an outer race, and a middle race, a motor carried by said gimbal, gearing means drivably coupling said motor and each of said middle races, said gearing means being so constructed and arranged that the middle races of each pair of bearing means are rotated in opposite directions, and control means for alternately reversing the direction of rotation of said motor after a predetermined number of revolutions of said middle races in one direction.

6. A gyroscopic instrument as set forth in claim 5 wherein said last-mentioned means comprising switch means carried by said gimbal and means coupled with said gearing means for operating said switch means.

7. A gyroscopic instrument as set forth in claim 5 wherein said gearing means comprises first and second pairs of bevel gears for respectively driving said first and second pairs of middle races, and a common bevel gear driven by said motor and coupled with each of said first and second pairs of bevel gears.

8. In a gyroscopic apparatus, a pair of gimbals, a pair of trunnions carried by one of said gimbals, an independently rotatable member journalled to each of said trunnions and upon which the second gimbal is journalled, and means for simultaneously rotating each of said members in opposite directions and periodically reversing the direction of rotation of said members, said last-mentioned means including motive means coupled through gearing simultaneously driving each of said members.

9. In a gyroscopic apparatus having a vertical axis, a pair of gimbals, a pair of trunnions carried by at least one of said gimbals, an independently rotatable member journalled to each of said trunnions and upon which the second gimbal is journalled, means for simultaneously rotating each of said members in opposite directions and periodically reversing the direction of rotation of said members, said last-mentioned means including motive means carried by one of said gimbals, said motive means being so constructed and arranged that the vertical axis thereof is substantially coaxial with the vertical axis of said gyroscopic apparatus.

10. In a directional gyroscope, suspension means for permitting freedom of movement about horizontal and vertical axes including a pair of rotatable bearing means mounted on at least the horizontal axis, each of said rotatable bearing means comprising an outer race, a middle race and an inner race with first rolling members intermediate the outer race and the middle race and second rolling members intermediate the middle race and the inner race, and means for rotating said middle race of each bearing means and periodically reversing the direction of rotation thereof.

11. In a directional gyroscope, suspension means for permitting freedom of movement about horizontal and vertical axes including a pair of rotatable bearing means mounted on at least the horizontal axis, each of said pair of rotatable bearing means comprising an outer race, a middle race and an inner race with rolling members intermediate the adjacent races thereof, power transmission means operatively coupled to said middle race of each rotatable bearing means for rotating each middle race in an opposite direction with respect to the other, and means operably coupled to said power transmission means for periodically and simultaneously reversing the direction of rotation of said power transmission means whereby the direction of rotation of each middle race is periodically and simultaneously reversed.

12. In a vertical gyroscope, suspension means for permitting freedom of movement about horizontal and vertical axes including rotatable bearing means mounted on at least one of the horizontal axes, said rotatable bearing means comprising an outer race, a middle race, and an inner race with rolling members intermediate the adjacent races thereof, power transmission means including gearing means operably coupled to said middle race for rotation thereof, and actuating means operably coupled to said power transmission means for periodically reversing the direction of rotation thereof whereby the direction of rotation of said middle race is periodically reversed.

13. In a gyroscopic apparatus containing a plurality of gyroscopes, suspension means including rotatable bearing means mounted on at least one axis of at least one of said gyroscopes, power transmission means operably coupled to said rotatable bearing means, and means operably coupled to said power transmission means for rotating said bearing means and periodically reversing the direction of rotation of said bearing means.

14. In a gyroscopic apparatus containing a plurality of gyroscopes, suspension means including rotatable bearing means mounted on a plurality of the axes of said gyroscopes, power transmission means operably coupled to said rotatable bearing means, motive means operably coupled to said power transmission means for rotating said bearing means, and means for periodically reversing the direction of rotation of said motive means whereby the direction of rotation of said bearing means is periodically reversed.

15. In a gyroscopic apparatus containing a plurality of gyroscopes, suspension means for said gyroscopes including a pair of rotatable bearing means mounted on a. least one of the axes of said gyroscopes, power transmission means operably coupled to said rotatable bearing means, motive means operably coupled to said power transmission means for rotating each one of said pair of rotatable bearing means in a direction opposite to the other one of said pair, and means for periodically and simultaneously reversing the direction of rotation of said motive means whereby the direction of rotation of each of said pair of bearing means is periodically and simultaneously reversed.

16. In a stable reference apparatus including three gyroscopes and suspension means therefor, a pair of rotatable bearing means mounted on at least one axis of each gyroscope, power transmission means operably coupled to said rotatable bearing means, actuating means operably coupled to said power transmission means for rotating each one of said pair of rotatable bearing means in a direction opposite to the other one of said pair, and means for periodically and simultaneously reversing the direction of rotation of said actuating means whereby the direction of rotation of each of said pair of bearing means is periodically and simultaneously reversed.

17. A method of minimizing drift in gyroscopic apparatus including the steps of rotating each of at least two dimetrically opposed bearings in a direction opposite to its corresponding bearing and alternating the direction of rotation of each bearing periodically and simultaneously after a predetermined number of revolutions.

18. In a gyroscopic apparatus, suspension means for permitting freedom of movement about an axis comprising a pair of bearing means, each of said bearing means including an inner member, an outer member and a middle member, and means for simultaneously rotating each of said middle members in opposite directions and periodically reversing the direction of rotation of said middle members, said last-mentioned means including motive means adapted to simultaneously drive each of said middle members and control means for cyclically reversing the direction of rotation of said motive means after each predetermined number of revolutions of said middle members.

19. In a gyroscopic apparatus as set forth in claim 18 wherein said motive means is adapted to simultaneously drive each of said middle members through gearing means and said control means includes switch means actuated by said gearing means.

20. In a gyroscopic apparatus as set forth in claim 18 wherein said control means includes timing means for controlling said motive means.

21. In gyroscopic apparatus, first and second components of said gyroscopic apparatus, two spaced rotatable members each concentric with respect to a common axis and each journalled with respect to said common axis in a respective one of said components whereby said first and second components are arranged for relative rotation, means for rotating said rotatable members simultaneously in opposite directions with respect to each other, and means for reversing the rotation of said rotatable members after they have rotated through several revolutions.

22. In a gyroscope, the combination with a frame and a casing having a rotor journalled therein, of anti-friction supporting means for supporting said casing in said frame for relative rotation therebetween, said supporting means comprising a pair of bearings disposed to support said casing on opposite sides thereof and each bearing including an intermediate element disposed in cooperative, load-supporting but relatively rotatable relationship between inner and outer anti-friction elements, and means for continuously rotating and periodically reversing the directions of rotation of both intermediate elements simultaneously in opposite directions through at least approximately one revolution.

23. In a gyroscope, the combination with a frame and a casing having a rotor journalled therein, of anti-friction supporting means for supporting said casing in said frame for relative rotation therebetween, said supporting means comprising a pair of bearings disposed to support said casing on opposite sides thereof and each bearing including an intermediate element disposed in cooperative, load-supporting but relatively rotatable relationship between inner and outer anti-friction elements, and means for rotating both intermediate elements in opposite directions through a plurality of revolutions and periodically reversing the directions of rotation thereof.

24. In a gyroscope, the combination with a frame and a casing having a rotor journalled bearing of anti-friction supporting means for supporting said casing in said frame for relative rotation therebetween, said supporting means comprising a bearing disposed to support said casing and including an intermediate element disposed in cooperative, load-supporting but relatively rotatable relationship between inner and outer anti-friction elements, and means for rotating and periodically reversing the rotation of said intermediate element for a plurality of revolutions first in one direction and then in the opposite direction.

25. In a gyroscope, the combination with a frame and a casing having a rotor journalled bearing of anti-friction supporting means for supporting said casing in said frame for relative rotation therebetween, said supporting means comprising a bearing disposed to support said casing and including an intermediate element disposed in cooperative, load-supporting but relatively rotatable relationship between inner and outer anti-friction elements, and means for rotating and periodically reversing the rotation of said intermediate element for at least one revolution first in one direction and then in the opposite direction.

26. An anti-friction bearing comprising in combination inner and outer anti-friction elements and an intermediate element disposed in cooperative, load-supporting but relatively rotatable relationship between said inner and outer elements, and means for rotating and periodically reversing the direction of rotation of said intermediate element for a plurality of revolutions first in one direction and then in the opposite direction.

27. An anti-friction bearing comprising in combination inner and outer anti-friction elements and an intermediate element disposed in cooperative, load-supporting but relatively rotatable relationship between said inner and outer elements, and means for rotating and periodically reversing the direction of rotation of said intermediate element for at least one revolution first in one direction and then in the opposite direction.

28. In combination, a pair of aligned, spaced bearings, a loaded shaft rotatably supported in said bearings, said bearings including an intermediate element disposed in cooperative, load-supporting but relatively rotatable relationship between inner and outer anti-friction elements, and means for continuously rotating and periodically reversing the directions of rotation of both intermediate elements simultaneously in opposite directions through at least approximately one revolution.

References Cited in the file of this patent

UNITED STATES PATENTS

| | | |
|---|---|---|
| 841,612 | Anschutz-Kaempfe | Jan. 15, 1907 |
| 976,918 | Richards | Nov. 29, 1910 |
| 1,386,029 | Rossiter | Aug. 2, 1921 |
| 1,600,071 | Shaifer | Sept. 14, 1926 |
| 1,845,592 | Fieux | Feb. 16, 1932 |
| 2,410,602 | Davis | Nov. 5, 1946 |
| 2,447,818 | Rieber | Aug. 24, 1948 |
| 2,518,159 | Martin | Aug. 8, 1950 |
| 2,577,942 | Agins | Dec. 11, 1951 |

FOREIGN PATENTS

| | | |
|---|---|---|
| 734,851 | Great Britain | Aug. 10, 1955 |